United States Patent
Shabel et al.

(10) Patent No.: US 9,396,070 B2
(45) Date of Patent: Jul. 19, 2016

(54) SYSTEM AND METHOD FOR SYSTEM-ON-A-CHIP SUBSYSTEM EXTERNAL ACCESS DETECTION AND RECOVERY

(71) Applicant: QUALCOMM INCORPORATED, San Diego, CA (US)

(72) Inventors: Jeffrey David Shabel, San Diego, CA (US); Philip Mueller, Jr., San Diego, CA (US); Zhurang Zhao, San Diego, CA (US); Carl Victor Streeter, Erie, CO (US); Rashmi Kulkarni, San Carlos, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 115 days.

(21) Appl. No.: 14/484,125

(22) Filed: Sep. 11, 2014

(65) Prior Publication Data

US 2016/0077916 A1 Mar. 17, 2016

(51) Int. Cl.
*G06F 11/00* (2006.01)
*G06F 11/14* (2006.01)
*G06F 11/30* (2006.01)

(52) U.S. Cl.
CPC .......... *G06F 11/141* (2013.01); *G06F 11/1428* (2013.01); *G06F 11/3062* (2013.01)

(58) Field of Classification Search
USPC ............................................................ 714/2
See application file for complete search history.

(56) References Cited

U.S. PATENT DOCUMENTS

| | | | |
|---|---|---|---|
| 8,489,794 B2 | 7/2013 | Byrne et al. | |
| 8,566,491 B2 | 10/2013 | Das et al. | |
| 2003/0093702 A1 | 5/2003 | Luo et al. | |
| 2012/0100895 A1 | 4/2012 | Priyantha et al. | |
| 2012/0254878 A1 | 10/2012 | Nachman et al. | |
| 2013/0103935 A1* | 4/2013 | Maddigan | G06F 1/3206 713/2 |
| 2013/0262903 A1 | 10/2013 | Thevar | |
| 2014/0303819 A1* | 10/2014 | Aoki | B60L 11/1861 701/22 |

FOREIGN PATENT DOCUMENTS

| | | |
|---|---|---|
| CN | 101859289 B | 6/2012 |
| WO | 2014065841 A1 | 5/2014 |

OTHER PUBLICATIONS

International Search Report and Written Opinion—PCT/US2015/048707—ISA/EPO—Nov. 27, 2015.

* cited by examiner

*Primary Examiner* — Sarai Butler
(74) *Attorney, Agent, or Firm* — Smith Tempel (57) ABSTRACT

Systems and methods for external access detection and recovery in a subsystem of a system-on-a-chip (SoC) in a portable computing device (PCD) are presented. In operation, a subsystem of the SoC is operated in an internal mode independently of the SoC while the SoC is in a low power state, such as a non-functional or zero power state or mode. The subsystem comprises a processor in communication with a memory, a sensor, and a monitor module. The monitor module detects when the processor of the subsystem requests access to a component external to the subsystem. In response to this detected request, the SoC is caused to enter into a full power state or mode, and the subsystem is caused to exit the internal mode of operation.

30 Claims, 8 Drawing Sheets

SYSTEM AND METHOD FOR SYSTEM-ON-A-CHIP SUBSYSTEM EXTERNAL ACCESS DETECTION AND RECOVERY

DESCRIPTION OF THE RELATED ART

Devices with a processor that communicate with other devices through a variety of communication media, including wireless signals, are ubiquitous. Mobile devices including portable computing devices (PCDs) may be used to communicate with a variety of other devices via wireless, analog, digital and other means. These mobile devices may include mobile telephones, portable digital assistants (PDAs), portable game consoles, palmtop computers, tablet computers and other portable electronic devices.

In addition to the primary function, PCDs may also be used for downloading and playing games; downloading and playing music; downloading and viewing video; global positioning system (GPS) navigation, web browsing, and running applications such as calendaring and address applications, electronic wallet software, and more.

To accommodate these ever-growing uses and demands for higher performance, modern PCDs typically include a system-on-a-chip (SoC) comprising one or more subsystems or cores (e.g., central processing unit(s), graphics processing unit(s), etc.) for controlling or performing varying functions of the PCD. However, operating each core/CPU and the SoC itself increases the power consumption on the PCD, reducing battery life, increasing touch temperatures of the PCD, degrading service, etc.

Various low or reduced power mode strategies have been implemented to decrease the power consumed by the SoC and/or its subsystems or cores. For example, when the PCD is not being actively used by an end user, some SoCs operate in a reduced or lower power mode which may include periods where the SoC is turned off.

In such reduced or lower power modes, the SoC may periodically power up or "wake up" in order to determine a status of the PCD and/or various functionality of the SoC. However, depending on what functionality the SoC needs to check or determine a status of, powering up the entire SoC may still incur a significant power cost. Additionally, trying to operate only portions of the SoC in order to save power can result in in the portion operating to stall and/or become hung up if that portion needs access to other, powered down portions of the SoC.

Thus, there is a need for improved systems and methods to allow subsystems within an SoC to effectively operate when the main portion of the SoC is powered down and/or in a low or reduced power mode.

SUMMARY OF THE DISCLOSURE

Systems and methods are disclosed that allow for external access detection and recovery by a subsystem of a system-on-a-chip (SoC) in a portable computing device (PCD). In operation, a subsystem of the SoC is operated in an internal mode independently of the SoC while the SoC is in a low power state, such as a non-functional or zero power state or mode. The subsystem comprises a processor in communication with a memory, a sensor, and a monitor module. The monitor module detects when the processor of the subsystem requests access to a component external to the subsystem. In response to this detected request, the SoC is caused to enter into a full power state or mode, and the subsystem is caused to exit the internal mode of operation.

One example embodiment is a computer system for a system-on-a-chip (SoC) in a portable computing device (PCD), the system comprising: a subsystem of the SoC configured to independently operate in an internal mode, the subsystem comprising: a processor in communication with a sensor and a memory, and a memory monitor in communication with the processor, wherein the monitor module is configured to: detect a request for access by the processor to a component external to the subsystem, cause the SoC to enter a full power state in response to the detected request for access, and cause the subsystem to exit the internal mode in response to the detected request for access.

Another example embodiment is a computer program product comprising a non-transitory computer usable medium having a computer readable program code embodied therein, said computer readable program code adapted to be executed to implement a method for external access detection and recovery in a subsystem of a system-on-a-chip (SoC) in a portable computing device (PCD), the method comprising: operating the subsystem of the SoC in an internal mode independently of the SoC while the SoC is in a low power state, the subsystem comprising a processor in communication with a memory, a sensor, and a monitor module; detecting with the monitor module a request for access by the processor to a component external to the subsystem; and in response to the detected request for access to the component external to the subsystem: causing the SoC to enter a full power state, and causing the subsystem to exit the internal mode.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures. Similarly, for reference numerals with ' designations, such as 102', the ' designation may designate an alternative embodiment for the underlying element with the same reference numerals (but without the' designation).

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files or data values that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer-readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the term "portable computing device" ("PCD") is used to describe any device operating on a limited capacity rechargeable power source, such as a battery and/or capacitor. Although PCDs with rechargeable power sources have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop or tablet computer with a wireless connection, among others.

In this description, the terms "central processing unit ("CPU")," "digital signal processor ("DSP")," "graphics processing unit ("GPU")," "chip," "video codec," "system bus," "image processor," and "media display processor ("MDP")" are non-limiting examples of processing components that may be implemented on an SoC. These terms for processing components are used interchangeably except when otherwise indicated. Moreover, as discussed below, any of the above or their equivalents may be implemented in, or comprised of, one or more distinct processing components generally referred to herein as "core(s)" and/or "sub-core(s)."

In this description, the terms "workload," "process load," "process workload," and "graphical workload" may be used interchangeably and generally directed toward the processing burden, or percentage of processing burden, that is associated with, or may be assigned to, a given processing component in a given embodiment. Additionally, the related terms "frame," "code block" and "block of code" may be used interchangeably to refer to a portion or segment of a given workload. Further to that which is defined above, a "processing component" or the like may be, but is not limited to being, a central processing unit, a graphical processing unit, a core, a main core, a sub-core, a processing area, a hardware engine, etc. or any component residing within, or external to, an integrated circuit within a portable computing device.

One of ordinary skill in the art will recognize that the term "MIPS" represents the number of millions of instructions per second a processor is able to process at a given power frequency. In this description, the term is used as a general unit of measure to indicate relative levels of processor performance in the exemplary embodiments and will not be construed to suggest that any given embodiment falling within the scope of this disclosure must, or must not, include a processor having any specific Dhrystone rating or processing capacity. Additionally, as would be understood by one of ordinary skill in the art, a processor's MIPS setting directly correlates with the power, frequency, or operating frequency, being supplied to the processor.

The present systems and methods for external access detection and recovery by a subsystem of an SoC in a PCD provide a cost effective way to implement a subsystem of the SoC. The subsystem is configured to operate in an internal mode, independently from the rest of the SoC, including when the rest of the SoC is in a low power mode, such as a non-functional, sleep, or zero-power state or mode. The subsystem comprises: a processor in communication with a sensor and a memory, and a memory monitor in communication with the processor. The monitor module is configured to detect a request for access by the processor to a component external to the subsystem. In response to detecting the request for access to an external component, the monitor module may, among other actions, cause the SoC to enter a full power state cause the subsystem to exit the internal mode.

In the present systems and methods, once the SoC enters into the low power mode, the subsystem begins its independent operation electrically isolated from the SoC. During this operation in an "internal mode" the signals or communications sent from the processor of the subsystem are monitored by the subsystem monitor module. If the processor attempts, properly or in error, to access any component such as a memory outside the subsystem, the monitor module detects the attempted access.

In response to this detection, the monitor module may send communications to a power manager of the SoC to cause the SoC to "wake-up" into a fully operational mode. The monitor module may also cause the subsystem into a state or mode where it can communicate/re-engage with the rest of the SoC. The monitor module may also send a communication to the subsystem processor, notifying the processor that the attempted access is to an external component. If the access to the external component was in error, the processor can initiate or execute error-handling routines or codes to try and recover from the error.

The present systems and methods allow for robust and flexible operation of subsystems of the SoC independently of the rest of the SoC, such as for routine checks of SoC sensors, without the need to keep the SoC fully operational and/or without the need to bring the SoC up from a low/reduced power mode or state. The present systems and methods allow such subsystems to operate independently, and to recover from errors that caused when such independent and isolated subsystems attempt to access a component outside of the subsystem.

Such external access may be proper, such as the processor of the subsystem acting in response to an input from the sensor. In these cases, the present system and method prevent an error message, crashing of the subsystem, or other problems by waking up the SoC and bringing the subsystem out of the internal/independent mode to provide a path for the subsystem to access the external component. Such external access on the other hand may be as a result of an error in some code of the subsystem. In these cases, notifying the subsystem of the attempted external access can allow error-handling routines to be implemented to try and correct the error and allow the subsystem to continue operation, avoiding processor or subsystem stalling or "hang-ups".

In one embodiment, the monitor module may be implemented with a single hardware device comprised of at least one monitor and a state machine, or may be separate components or devices including at least one monitor in communication with a state machine. By using a hardware device (or devices) for the monitor module in these embodiments, it is possible to send interrupt signals upon detection of the attempted external access by the processor, even if such attempted external access has caused the subsystem processor to stall or become hung-up while waiting for the access to complete. In other embodiments, the monitor module may be only partially implemented in hardware or in firmware. The ability to automatically detect, and recover from, attempts by the isolated subsystem to access external components allows for improved operation of such subsystems on an SoC while the SoC is in a low power mode, providing power savings from reduced operation of the SoC in a cost effective manner.

The system for providing external access detection and recovery by a subsystem of an SoC in a PCD described herein, or portions of the system, may be implemented in hardware or software. If implemented in hardware, the devices can include any, or a combination of, the following technologies, which are all well known in the art: discrete electronic components, an integrated circuit, an application-specific integrated circuit having appropriately configured semiconductor devices and resistive elements, etc. Any of these hardware devices, whether acting or alone, with other devices, or other components such as a memory may also form or comprise components or means for performing various operations or steps of the disclosed methods.

When a PCD or other system described herein is implemented, or partially implemented, in software, the software portion can be used to perform various steps of the methods described herein. The software and data used in representing various elements can be stored in a memory and executed by a suitable instruction execution system (microprocessor). The software may comprise an ordered listing of executable instructions for implementing logical functions, and can be embodied in any "processor-readable medium" for use by or in connection with an instruction execution system, apparatus, or device, such as a single or multiple-core processor or processor-containing system. Such systems will generally access the instructions from the instruction execution system, apparatus, or device and execute the instructions.

Figure 1:
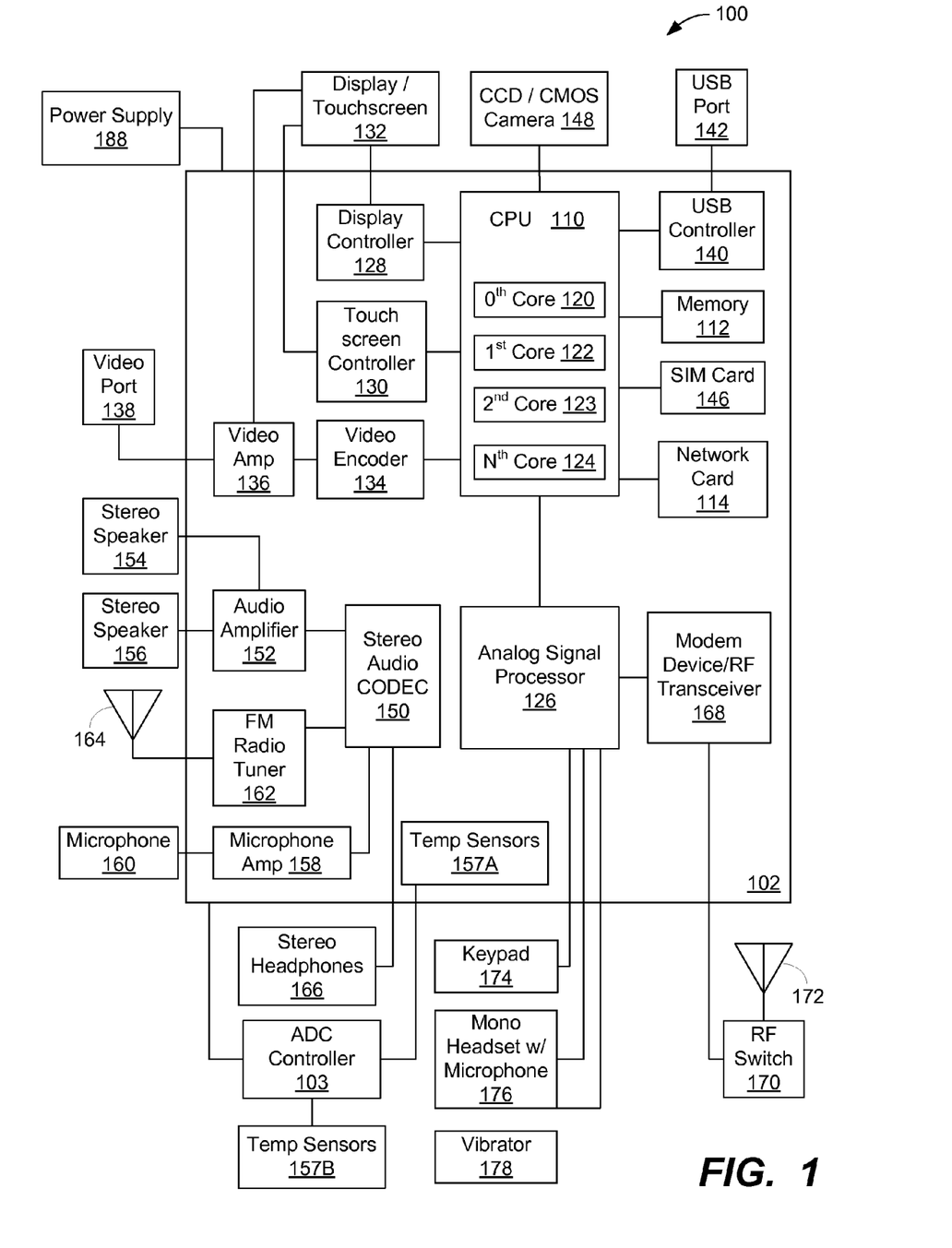
FIG. 1 is a block diagram of an example embodiment of a portable computing device (PCD) in which the present invention may be implemented.

FIG. 1 is a block diagram of an exemplary, non-limiting aspect of a PCD 100 that may implement the present systems and methods in the form of a wireless telephone capable of communicating with one or more wireless communication system. Such wireless communication system may be a broadband wireless communication system, including a Long Term Evolution (LTE) system, a Code Division Multiple Access (CDMA) system, a Frequency Division Multiple Access (FDMA) system, a Global System for Mobile Communications (GSM) system, a wireless local area network (WLAN) system, some other wireless system, or a combination of any of these. A CDMA system may implement Wideband CDMA (WCDMA), CDMA 1x, Evolution-Data Optimized (EVDO), Time Division Synchronous CDMA (TD-SCDMA), or some other version of CDMA.

As shown, the PCD 100 includes an on-chip system (or SoC) 102 that includes a heterogeneous multi-core central processing unit ("CPU") 110 and an analog signal processor 126 that are coupled together. The CPU 110 may comprise a zeroth core 120, a first core 122, second core 123, and an Nth core 124 as understood by one of ordinary skill in the art. Further, instead of a CPU 110, a digital signal processor ("DSP") may also be employed as understood by one of ordinary skill in the art. Moreover, as is understood in the art of heterogeneous multi-core processors, each of the cores 120, 122, 123, 124 may process workloads at different efficiencies under similar operating conditions. Each of the cores 120, 122, 123, 124 may control one or more function of the PCD 100. For example, the first core 120 may be a graphics processing unit (GPU) for controlling graphics in the PCD 100. Such GPU/first core 120 may further include drivers and/or other components necessary to control the graphics in the PCD 100, including controlling communications between the GPU core 120 and memory 112 (including buffers). For another example, a different core such as the Nth core 124 may run the PCD operating system, such as a high-level operating system (HLOS). Such Nth/HLOS core 124 may further include drivers, hardware interfaces, and/or other components necessary to run the HLOS, including communications between the core 230 and memory 112 (which may include flash memory).

Any of the cores 120, 122, 123, 124 may be a separate processor such as a CPU or a digital signal processor. Additionally, each of the cores may be functionally grouped together with other components, such as memory 112, sensors, or other hardware of the PCD 100 to form a subsystem as described below. Such subsystem(s) may be implemented in order to perform certain functionality of the PCD, such as an audio subsystem, a GPS subsystem, a sensor subsystem, etc. One or more of such subsystems may also be configured to operate independently of the SoC 102, such as to continue operation when the SoC 102 has been placed into a low or reduced power state or mode, including a power off state or mode.

As illustrated in FIG. 1, a display controller 128 and a touch screen controller 130 are coupled to the multicore CPU 110. In turn, a display/touchscreen 132, external to the on-chip system 102, is coupled to the display controller 128 and the touch screen controller 130. A digital camera 148 may also be coupled to the multicore CPU 110. In such embodiments, the digital camera 148 may be controlled by one of the cores of the multicore CPU 110. In an exemplary aspect, the digital camera 148 is a charge-coupled device (CCD) camera or a complementary metal-oxide semiconductor (CMOS) camera The PCD 100 of FIG. 1 may further include a video encoder 134, e.g., a phase alternating line (PAL) encoder, a sequential couleur a memoire (SECAM) encoder, or a national television system(s) committee (NTSC) encoder, or any other type of video decoder 134 coupled to the multicore CPU 110. Further, a video amplifier 136 is coupled to the video encoder 134 and the display/touchscreen 132. A video port 138 is coupled to the video amplifier 136. As depicted in FIG. 1, a universal serial bus (USB) controller 140 is coupled to the multicore CPU 110. Also, a USB port 142 is coupled to the USB controller 140. A memory 112 is also illustrated as coupled to the multicore CPU 110. Such memory 112 may for example be random access memory (RAM), read only memory (ROM), flash memory, or any combination thereof. A subscriber identity module (SIM) card 146 may also be coupled to the multicore CPU 110. In other embodiments, multiple SIM cards 146 may be implemented.

As further illustrated in FIG. 1, a stereo audio CODEC 150 may be coupled to the multicore CPU 110. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation (FM) radio tuner 162 may be coupled to the stereo audio CODEC 150. Also, a FM antenna 164 is coupled to the FM radio tuner 162. Further, stereo headphones 166 may be coupled to the stereo audio CODEC 150.

FIG. 1 further indicates that a modem device/radio frequency ("RF") transceiver 168 may be coupled to the multicore CPU 110. The modem device 168 may support one or more of the wireless communications protocols, such as GSM, CDMA, W-CDMA, TDSCDMA, LTE, and variations of LTE such as, but not limited to, FDB/LTE and PDD/LTE wireless protocols. Additionally, there may be multiple modem devices 168, and in such embodiments, different modem devices 168 may support come or all of the wireless communication protocols and/or technologies listed above.

In some implementations the modem device 168 may be further comprised of various components, including a separate processor, memory, and/or RF transceiver. In other implementations the modem device 168 may simply be an RF transceiver. Further, the modem device 168 may be incorporated in an integrated circuit. That is, the components comprising the modem device 168 may be a full solution in a chip and include its own processor and/or core that may be monitored by the systems and methods described herein. Alternatively, various components comprising the modem device 168 may be coupled to the multicore CPU 110 and controlled by one of the cores 120, 122, 124 of the CUP 110. An RF switch 170 may be coupled to the modem device 168 and an RF antenna 172. In various embodiments, there may be multiple RF antennas 172, and each such RF antenna 172 may be coupled to the modem device 168 through an RF switch 170.

As shown in FIG. 1, a keypad 174 may be coupled to the multicore CPU 110 either directly, or through the analog signal processor 126. Also, a mono headset with a microphone 176 may be coupled to the multicore CPU 110 and or analog signal processor 126. Further, a vibrator device 178 may also be coupled to the multicore CPU 110 and/or analog signal processor 126. FIG. 1 also shows that a power supply 188 may be coupled to the on-chip system 102, and in some implementations the power supply 188 is coupled via the USB controller 140. In a particular aspect, the power supply 188 is a direct current (DC) power supply that provides power to the various components of the PCD 100 that require power. Further, in a particular aspect, the power supply 188 may be a rechargeable DC battery or a DC power supply that is derived from an alternating current (AC) to DC transformer that is connected to an AC power source.

The multicore CPU 110 may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop that is converted to digital signals with an analog-to-digital converter ("ADC") controller 103. However, other types of thermal sensors 157 may be employed without departing from the scope of the disclosure.

FIG. 1 further indicates that the PCD 110 may also include a network card 114 that may be used to access a data network, e.g., a local area network, a personal area network, or any other network. The network card 114 may be a Bluetooth network card, a WiFi network card, a personal area network (PAN) card, or any other network card well known in the art. Further, the network card 114 may be incorporated in an integrated circuit. That is, the network card 114 may be a full solution in a chip, and may not be a separate network card 114.

As depicted in FIG. 1, the display/touchscreen 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, and the power supply 180 are external to the SoC 102.

The SoC 102 may also include various bus controllers (not shown). For example, a first example of a may be responsive to signals in the bus interface that communicatively couples the CPU 110 to components of a multimedia subsystem, including the video encoder 134. It should be understood that any number of similarly configured bus controllers can be arranged to monitor a bus interface arranged in the on-chip system 102. Alternatively, a single bus controller could be configured with inputs arranged to monitor two or more bus interfaces that communicate signals between CPU 110 and various subsystems of the PCD 100 as may be desired.

In a particular aspect, one or more of the method steps described herein may be enabled via a combination of data and processor instructions stored in the memory 112 and/or a memory located on the CPU 110. These instructions may be executed by one or more cores 120, 122, 123, 124 in the multicore CPU 110 and/or subsystems of the SoC 102 in order to perform the methods described herein. Further, the multicore CPU 110, one or more of the cores 120, 122, 123, 124, the memory 112, other components of the PCD 100, or a combination thereof may serve as a means for executing one or more of the method steps described herein in order enable external access detection and recovery by a subsystem of the SoC 102.

Figure 2A:
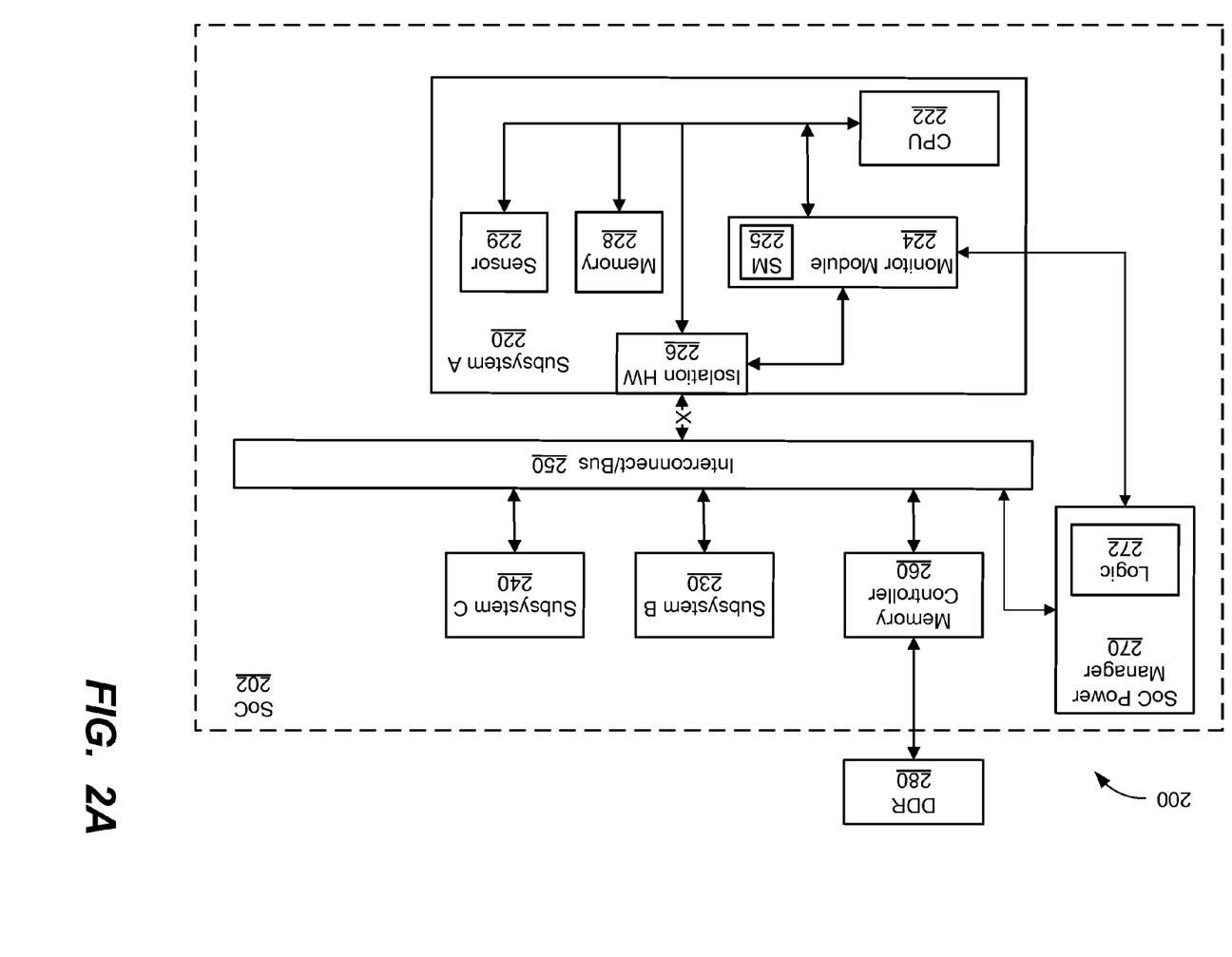
FIG. 2A is a block diagram showing an exemplary embodiment of a system for external access detection and recovery by a subsystem of an SoC in a PCD, such as the PCD embodiment illustrated in FIG. 1.
Figure 2B:
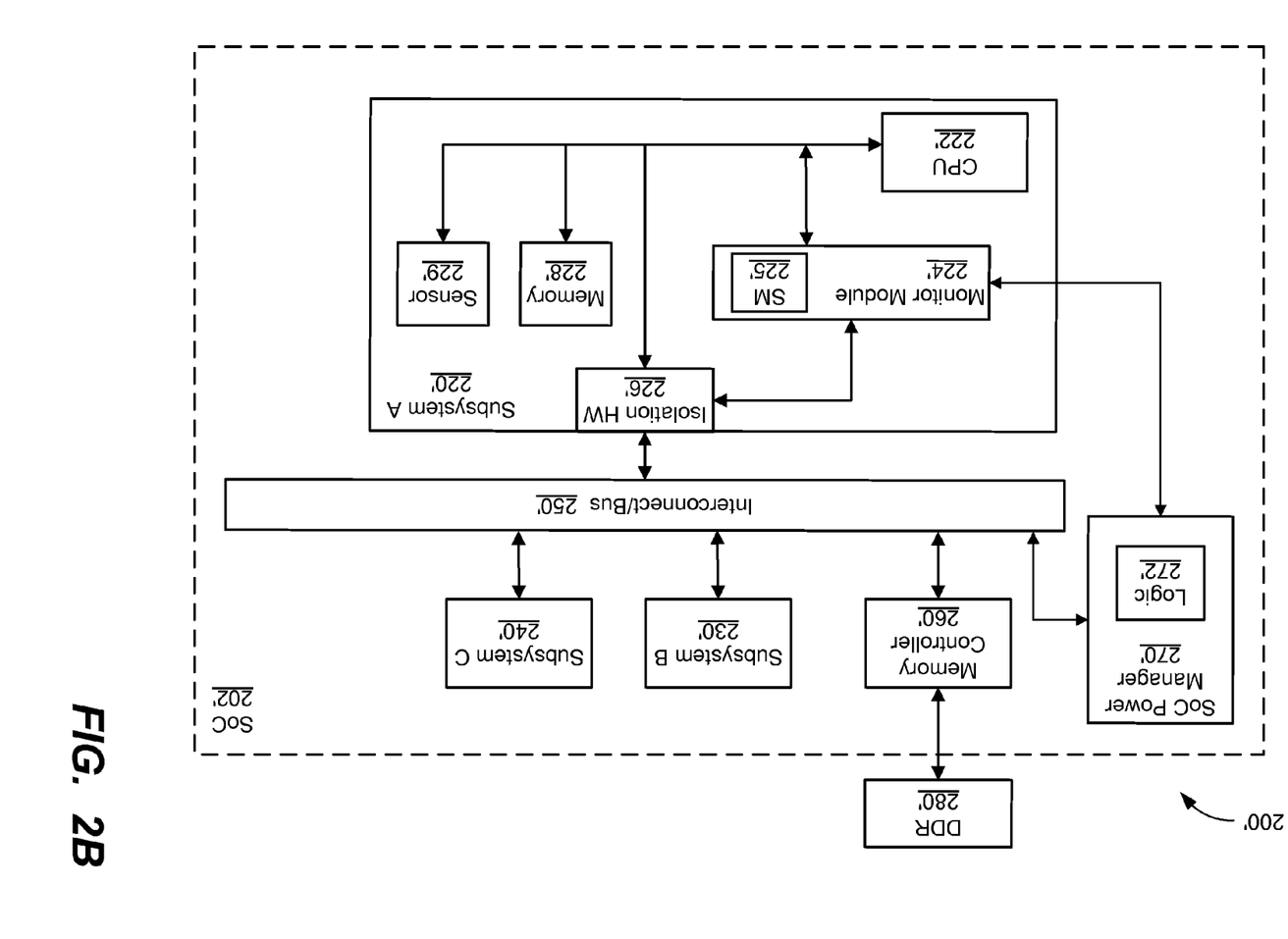
FIG. 2B is a block diagram illustrating aspects of the exemplary system of FIG. 2A.

FIGS. 2A and 2B are a block diagrams showing an exemplary embodiment of a system for external access detection and recovery by a subsystem of an SoC in a PCD, such as the PCD embodiment illustrated in FIG. 1. FIGS. 2A and 2B illustrate the same embodiment of the exemplary system 200/200' in differing operational states as discussed below. FIG. 2A illustrates the exemplary system 200 when the SoC 202 is in a non-functional/low or zero power mode or state and Subsystem A 220 is operating independently. FIG. 2B illustrates the exemplary system 200' when the SoC 202 is fully functional/powered.

Starting with FIG. 2A, the exemplary system 200 includes a system-on-a-chip (SoC) integrated circuit 202, which could be implemented in a PCD (similar to the SoC 102 in FIG. 1). The SoC 202 of FIG. 2A includes a Subsystem A 220, Subsystem B 230, and Subsystem C 240 all connected to an interconnect or bus 250 of the SoC 202. The interconnect/bus 250 of the SoC 202 may be any desired type of bus or interconnect which may depend on the architecture of the SoC 202 and/or the uses for which the SoC 202 or PCD are intended.

The SoC 202 also includes a Memory Controller 260 in communication with the interconnect/bus 250 and also in communication with a memory external to the SOC 202, DDR 280. Memory Controller 260 may control the access to various memories of the SoC 202, and also may allow the various components of the SoC 202, including Subsystem A 220, Subsystem B 230 and Subsystem C 240, to access the external DDR 280 memory when the SoC 202 is powered up and/or in a functional state or mode.

The SoC 202 also includes a Power Manager 270 with internal Logic 272 that enables the SoC 202 to enter into and exit out of various power modes or states, including functional/full power modes and states and non-functional low power modes and states. Regardless of the functional state of the SoC 202, the Power Manager 270 is always on/powered and able to wake up or power down the SoC 202 as desired according to the requirements of the PCD.

In the embodiment illustrated in FIG. 2A, Subsystem A 220 is configured to be able to operate independently of the other portions of the SoC 202, including operating when the SoC 202 is in a low power and/or non-functional mode or state. By contrast, Subsystem B 230 and Subsystem C 240 in the illustrated embodiment are not configured to operate independently of the other portions of the SoC 202. Thus, Subsystems B 230 and C 240 will be non-functional when the SoC 202 is in a low power and/or non-functional mode or state.

Subsystem A 220 includes a processor CPU 222, which could be implemented as one of the cores 120, 122, 123, 124 of FIG. 1. In some embodiments, the CPU 222 could be implemented as a general purpose processing unit, while in other embodiments the CPU 222 may be implemented as a dedicated processor, such as a DSP. The CPU 222 of Subsystem A 220 is in communication with a memory 228 and sensor 229, which are also functional and operational independently of the other portions of the SoC 202, including operating when the SoC 202 is in a low power and/or non-functional mode or state.

In various embodiments, Subsystem A 220 may include more or less components than illustrated in FIG. 2A. Additionally, in some embodiments, the components of Subsystem A 220 may be physically located near each other on the SoC 202, forming a physical subsystem of the SoC 202. In other embodiments, the components of Subsystem A 220 may be physically located apart from each other on the SoC 202, such that Subsystem A 220 illustrated in FIG. 2A represents a subsystem comprised of components located in varying locations on the SoC 202. Additionally, to allow operation when the rest of the SoC 202 is in a low power or zero power state or mode, Subsystem A 220 may also include a local power rail (not illustrated) and/or local data bus (partially illustrated with the connector lines between the components of Subsystem A 220).

The sensor 229 illustrated in FIG. 2A may in some embodiments be related to the accelerometer and/or gyros of a PCD. In other embodiments, the sensor 229 may be related to the audio, wireless, GPS, or other functionality of the PCD as desired. Additionally, Subsystem A 220 may include more than the single sensor 229 illustrated in FIG. 2A. For example, Subsystem A 220 may include two or more sensors, including sensors of different types or related to different functions of the SoC 202 and/or PCD.

The memory 228 illustrated in FIG. 2A may be any desired type of memory, but typically will not be a flash or other code-intensive type of memory. As discussed below, the memory 228 acts as a local memory for the Subsystem A 220. Thus, the CPU 222 can read data from and write data to the memory 228, both when the SoC 202 is fully operational, and also when the SoC 202 is in a low or zero power mode or state. In various embodiments, Subsystem A 220 may include more than the single memory 228 illustrated in FIG. 2A. For example, Subsystem A 220 may include two or more memories, and each such memory may be of the same type or a different type (or any combination thereof) as desired.

As shown in FIG. 2A, Subsystem A 220 includes a Monitor Module 224 in communication with the CPU 222 for monitoring signals/communications from the CPU 222. The illustrated Monitor Module 224 is implemented in hardware and comprises hardware monitors and a State Machine 225. In various embodiments, the Monitor Module 224 and State Machine 225 may be separate components rather than the single component illustrated in FIG. 2A. For example, the Monitor Module 224 and State Machine 225 may be separate hardware components in communication with each other and/or the CPU 222. The Monitor Module 224 and/or State Machine 225 operate to provide external access detection and recovery when Subsystem A 220 is operating independently of the rest of the SoC 202 as discussed below.

Subsystem A 220 also includes various isolation hardware represented by Isolation HW block 226 in FIG. 2A. The Isolation HW 226 serves to isolate Subsystem A 220 from the rest of the SoC 202 so that Subsystem A can continue to operate when the SoC 202 enters a low or zero power mode or state. For example, as illustrated in FIG. 2A, when the SoC 202 is in a non-functional/low power mode or state, the Isolation HW 226 can operate to electrically isolate Subsystem A 220 (and its components) from the rest of the SoC 202 by isolating the connection with the interconnect/bus 250. Isolation HW 226 may include clamps and other hardware components necessary to achieve isolation from the rest of the SoC 202, including isolation from the interconnect/bus 250, power rails, etc. of the SoC 202.

In operation, the SoC 202 may enter into a non-functional and/or low or zero power mode or state, such as part a power savings routine. The Isolation HW 226 of Subsystem A 220 engages to electrically and otherwise isolate Subsystem A 220 from the rest of the SoC 202, allowing Subsystem A 220 to continue operation independently of the rest of the SoC 202. For example, the SoC 202 may have entered into a sleep or non-functional mode due to inactivity of the PCD.

However, it may be desirable or required for the SoC 202 to periodically check sensors, such as sensors related to wireless connectivity, GPS connectivity or positioning, the accelerometer or gyros of the PCD to determine that a user is moving/operating the PCD, an audio sensor to detect a wake up sound or command such as from a user of the PCD, etc. Rather than periodically waking up the entire SoC 202 to perform such checks, Subsystem A 220 can continue to operate independently in an "island mode" or "internal mode" electrically isolated from the rest of the SoC 202 while the SoC 202 is in the sleep, reduced power, or non-functional mode. While operating in such island mode, Subsystem A 220 or a processor such as CPU 222 of Subsystem A can monitor the local sensor 229 (and any additional sensors) and/or access the local memory 228 as necessary. This island mode of operation for Subsystem A 220 allows for the desired or necessary checking of the sensor 229 at a much lower power cost/consumption than continually waking up the SoC 202 before checking sensor 229.

While Subsystem A 220 of the SoC 202 is operating in this island mode, the Monitor Module 224 monitors the communications/signals to and from the CPU 222. If the CPU 222, based on a signal from the sensor 229 for example, attempts to access a component outside of Subsystem A 220, the Monitor Module 224 detects the attempted access. For example if the CPU 222 attempts to access an external memory such as the DDR 280 while Subsystem A 220 is operating in the island mode, the Monitor Module 224 will detect the attempted access. The Monitor Module 224 will then send a signal, such as an interrupt or other communication, to the SoC Power Manager 270 telling the SoC Power Manager 270 to begin waking up the SoC 202 to allow the CPU 222 to access the DDR 280.

The SoC Power Manager 270 may include Logic 272 that allows the SoC Power Manager 270 to interpret the signal or communication from the Monitor Module 224. In some embodiments, upon receiving the signal the SoC Power Manager 270 may operate to cause only the portions of the SoC 202 necessary to complete the access by the CPU 220 to become powered/operational. In these embodiments, the signal or communication from the Monitor Module 224 may include information that the SoC Power Manager 270 interprets, such as using Logic 272, to determine the components of the SoC 202 needed to complete the access. In other embodiments, upon receiving the signal from the Monitor Module 224, the SoC Power Manager 270 operates to cause the entire SoC 202 to restore to a functional and/or powered state or mode.

The Monitor Module 224 may also trigger the State Machine 225 to transition Subsystem A 220 to a non-island/regular functional mode such that Subsystem A 220 can communicate with the rest of the SoC 202. In embodiments where the Monitor Module 224 and State Machine 225 are separate components, the Monitor Module 224 may send a signal such as an interrupt to trigger the State Machine 225. In embodiments where the State Machine 225 is part of the Monitor Module 224, the Monitor Module 224 may directly control the operation of the State Machine 225.

Continuing the above example where the CPU 222 is attempting to access DDR 280, the Monitor Module 224 may trigger the State Machine 225 to cause the Isolation HW 226 to re-enable communications with the interconnect/bus 250 to enable the CPU 222 to complete the access to the external memory DDR 280. Other examples could include the State Machine 225 causing other hardware to re-connect Subsystem A 220 to the SoC 202 power rail to support increased activity of Subsystem A 220 and/or the components of Subsystem A 220 such as CPU 222.

In summary, in the above example the Monitor Module 224 detects the attempt by CPU 222 to access a component, such as DDR 280, that is external to the Subsystem A 220. The Monitor Module 224, either itself or in combination with the State Machine 225, uses this detected attempted access as a trigger to wake up the rest of the SoC 202 to provide a path to and/or wake up the component that the CPU 222 is trying to access. The Monitor Module 224 also, again either itself or in combination with the State Machine 225, causes Subsystem A 220 to be brought into a state where Subsystem A (and its components such as CPU 222) and into a state or mode where it can communicate with and/or interact with the rest of the SoC 202.

In another example the SoC 202 is non-functional/in a low or zero power mode and Subsystem A 220 is continuing to operate, such as in the island mode or internal mode. In this example the CPU 222 may attempt to access a component outside of Subsystem A 220 such as DDR 280 due to a signal from the sensor 229 or due to an error in some code or routine being performed by the CPU 222. After detecting the attempted access outside of Subsystem A 220 as described above, the Monitor Module 224 can also send a signal to the CPU 222 notifying the CPU 222 that the attempted access (of DDR 280 in this example) is outside of Subsystem A 220.

In various embodiments, the Monitor Module 224 may send this signal/communication to the CPU 222 before, after, or instead of performing the various "wake up" functions described above. The signal or communication from the Monitor Module 224 to the CPU 222 may be in any desired form, such as an interrupt to the CPU 222. In some embodiments the Monitor Module 224 may always send the signal/communication to the CPU 222 without regard to whether the attempted external access by the CPU 222 was proper or was in error. In such embodiments, upon receiving the signal from the Monitor Module 224 the CPU 222 may ignore the signal if the CPU 222 determines that the attempted access is not an error, or the CPU 222 may initiate or start one or more error handling routines or code if the attempted external access is an error.

For these embodiments, by implementing the Monitor Module 224 in hardware, by enabling the access to the external component to complete, and by also sending an interrupt to the CPU 222 with a notification of the external access, the Monitor Module 224 allows for a greater or improved chance for the CPU 222 and/or Subsystem A 220 to recover from any errors that may occur from the CPU 222 attempting to access external components while the Subsystem A 220 is operating in (or entering into or coming out of) the island mode apart from the rest of the SoC 202.

In various embodiments, it may be preferred for the Monitor Module 224 to send the signal/interrupt to the CPU 222 before the Monitor Module 224 performs the other "wake up" functions for the SoC 202 and/or Subsystem A 220. In other embodiments, it may be preferred for the Monitor Module 224 to not perform the "wake up" functions until the CPU 222 has received the signal/interrupt and responded to the Monitor Module 224.

Turning to FIG. 2B the system 200' is illustrated after the SoC 202' has been awakened and/or is operating at full power. As illustrated in FIG. 2B, the connection(s) between Subsystem A 220' and the SoC 202' have been restored, such as by disabling the Isolation HW 226'. The restored connections between the SoC 202' and the Subsystem A 220' include communications between the CPU 222' and the interconnect/bus 250' allowing a path for the CPU 222' to access components outside Subsystem A 220' such as external memory DDR 280'.

In some embodiments, when the SoC 202' has returned to full power/a functional state the Monitor Module 224' may be disabled, such as from a signal or acknowledgement from the SoC Power Manager 270' or other component of the SoC 202' or from a trigger or logic internal to the Monitor Module 224' that operates to disable the Monitor Module 224' when the Monitor Module 224' sends the "wake up" signal/communication to the SoC Power Manager 270'.

In other embodiments, the Monitor Module 224' may continue to monitor the CPU 222' when the SoC 202' has returned to full power/a functional state. In such embodiments, the Monitor Module 224' may no longer take any actions when detecting that the CPU 222' attempts to access a component such as DDR 280' that is external to Subsystem A 220'. For example the Monitor Module 224' may no longer send a "wake up" signal/communication to the SoC Power Manager 270' and/or no longer send a signal/communication to the CPU 222' alerting the CPU 222' of the attempted access to components external to Subsystem A 220'.

Figure 3:
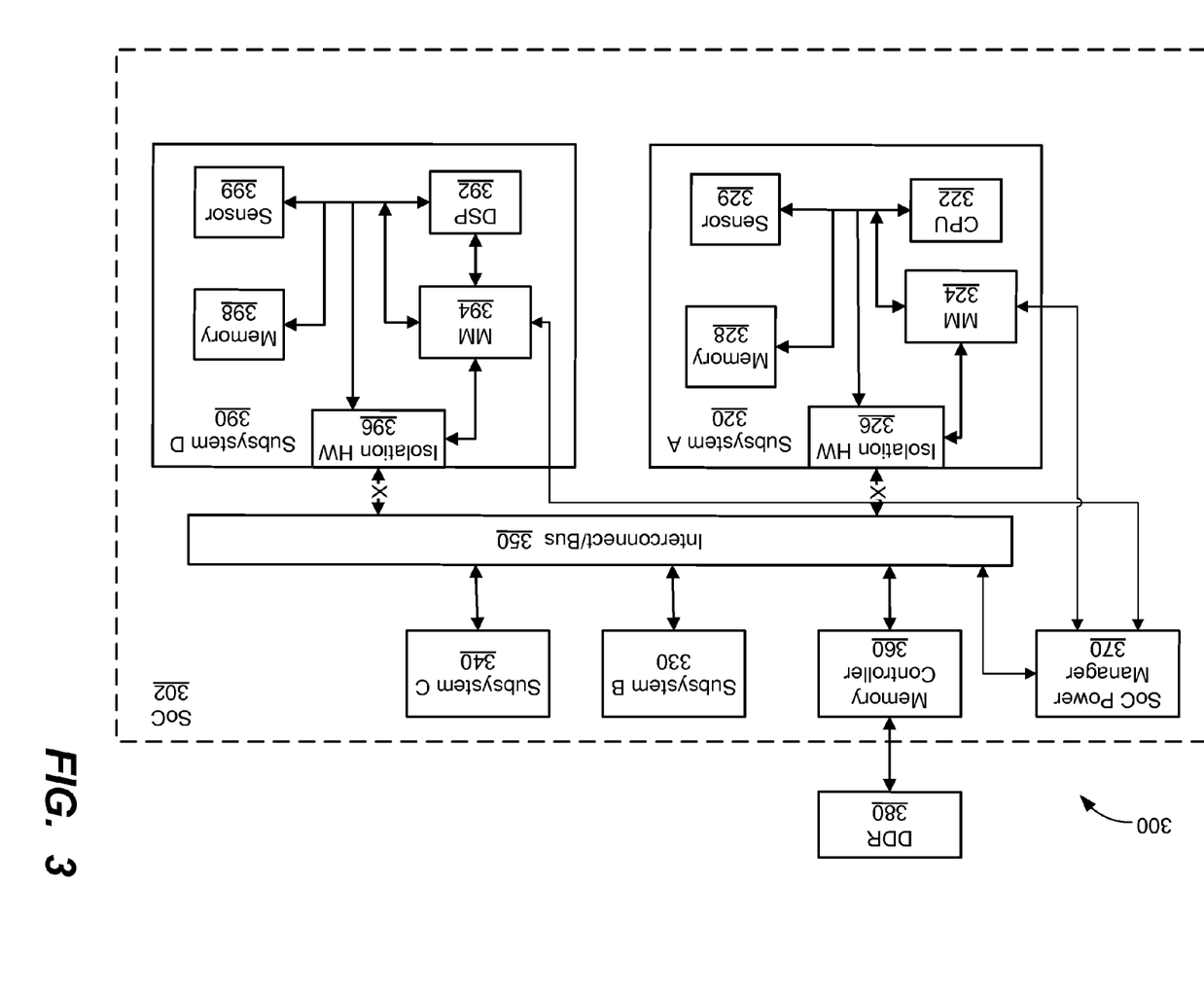
FIG. 3 is a block diagram of illustrating another exemplary embodiment of a system for external access detection and recovery by a subsystem of an SoC in a PCD, such as the PCD embodiment illustrated in FIG. 1.

FIG. 3 is a block diagram of illustrating a second exemplary embodiment of a system for external access detection and recovery by a subsystem of an SoC in a PCD, such as the PCD embodiment illustrated in FIG. 1. Similar to the embodiment illustrated in FIGS. 2A and 2B, the system 300 of FIG. 3 includes an SoC 302 with Subsystem A 320, Subsystem B 330, and Subsystem C 340 all connected to an interconnect or bus 350 of the SoC 302. The embodiment of FIG. 3 also includes Subsystem D 390 also connected to the interconnect/bus 350. The interconnect/bus 250 of the SoC 302 may be any desired type of bus or interconnect which may depend on the architecture of the SoC 302 and/or the uses for which the SoC 302 or PCD are intended.

The SoC 302 also includes a Memory Controller 360 in communication with the interconnect/bus 350 and also in communication with a memory external to the SOC 302, DDR 380. Memory Controller 360 may control the access to various memories of the SoC 302, and also may allow the various components of the SoC 302, including Subsystems A 320, B 330, C 340 and D 390, to access the external DDR 380 memory when the SoC 302 is powered up and/or in a functional state or mode. The SoC 302 also includes a Power Manager 370 that operates similarly to the SoC Power Manager 270 discussed above with respect to FIG. 2A-2B.

In the embodiment illustrated in FIG. 3, Subsystem A 320 and Subsystem D 390 are both configured to be able to operate independently of the other portions of the SoC 302 (and each other) including operating when the SoC 302 is in a low power and/or non-functional mode or state. By contrast, Subsystem B 330 and Subsystem C 340 in the illustrated embodiment are not configured to operate independently of the other portions of the SoC 302. Thus, Subsystems B 330 and C 340 will be non-functional when the SoC 302 is in a low power and/or non-functional mode or state.

Like the Subsystem A 220 discussed above in FIG. 2A-2B, Subsystem A 320 of FIG. 3 includes a processor, CPU 322, which could be implemented as one of the cores 120, 122, 123, 124 of FIG. 1. In some embodiments, the CPU 322 could be implemented as a general purpose processing unit, while in other embodiments the CPU 322 may be implemented as a dedicated processor. The CPU 322 of Subsystem A 320 is in communication with a memory 328 and sensor 329, which are also functional and operational independently of the other portions of the SoC 302, including operating when the SoC 302 is in a low power and/or non-functional mode or state. As discussed above, although only one memory 328 and one sensor 329 is illustrated in FIG. 3, Subsystem A 320 could include multiple, and different types of, memories and/or sensors.

Subsystem A 320 includes various isolation hardware represented by Isolation HW block 326 in FIG. 3. The Isolation HW 326 serves to isolate Subsystem A 320 from the rest of the SoC 302 so that Subsystem A 320 can continue to operate when the SoC 302 enters a low or zero power mode or state as discussed above. Isolation HW 326 may include clamps and other hardware components necessary to achieve isolation from the rest of the SoC 302, including isolation from the interconnect/bus 350, power rails, etc. of the SoC 302.

As shown in FIG. 3, Subsystem A 320 also includes a Monitor Module 324 in communication with the CPU 322 for monitoring signals/communications from the CPU 322. The illustrated Monitor Module 324 is implemented in hardware and comprises hardware monitors as well as a state machine (not shown). In various embodiments, the Monitor Module 324 and state machine may be separate components rather than the single component illustrated in FIG. 3. The Monitor Module 324 and/or state machine operate to provide external access detection and recovery when Subsystem A 320 is operating independently of the rest of the SoC 302 as discussed above.

The embodiment of FIG. 3 includes Subsystem D 390 that is also configured to operate independently of the rest of the SoC 302, including Subsystem A, such as in the island mode discussed above. Subsystem D 390 is similar to Subsystem A 320, except that Subsystem D 390 implements a DSP 392 as the processing unit. The various other components of Subsystem D 390, including Isolation HW 396, Monitor Module 394, memory 398, and sensor 399 are similar to the components discussed above for Subsystem A 320.

Note that the components illustrated for both Subsystem A 320 and Subsystem D 390 are illustrative. Each of Subsystem A 320 and/or Subsystem D 390 may include additional or different components. For example, each of Subsystem A 320 and/or Subsystem D 390 may include local communication buses, local power rails, etc. to allow the respective subsystem to operate independently of the rest of the SoC 302. Similarly, the system 300 may include additional subsystem(s) configured to operate independently of the rest of the SoC 302 in addition to Subsystem A 320 and Subsystem D 390 illustrated in FIG. 3.

Although illustrated has having similar components to each other, Subsystem A 320 may have different components, and differently configured components, than Subsystem D. For example, Subsystem A 320 may include multiple sensors in addition to the illustrated sensor 329, while Subsystem D 390 may only include one sensor 399. Similarly, the sensor 329 of Subsystem A 320 may be a different kind of sensor and/or related to different functional areas of the PCD than the sensor 399 of Subsystem D 390. For example sensor 329 of Subsystem A 320 may relate to the audio functionality and may operate to sense a "wake up" command or sound from the user of the PCD, while sensor 399 of Subsystem D 390 may relate to the accelerometer and/or gyros of the PCD as discussed above. Other configurations and/or types of sensors may also be implemented in either or both of the illustrated subsystems.

Operationally, each of Subsystem A 320 and Subsystem D 390 will operate as discussed above with respect to Subsystem A 220 of FIGS. 2A-2B. Thus, either or both of Subsystem A 320 or Subsystem D 390 may operate in the island mode when the SoC 302 is in a non-functional and/or low or zero power mode or state. The Monitor Modules 324 and 394 of each subsystem will operate to detect attempts by their respective CPU 322 or DSP 392 to access a component of the SoC 302 outside their respective subsystems. If such external access is detected each Monitor Module 324 or 394 may take for its respective subsystem one or more of the actions discussed above for Monitor Module 220 of FIGS. 2A-2B. In this manner, when the SoC 302 is in a non-functional state it may have multiple subsystems continuing to operate, including in the island mode discussed above, each subsystem performing its own assigned functions and each subsystem having the ability to awaken the SoC 302 as discussed above.

Figure 4A:
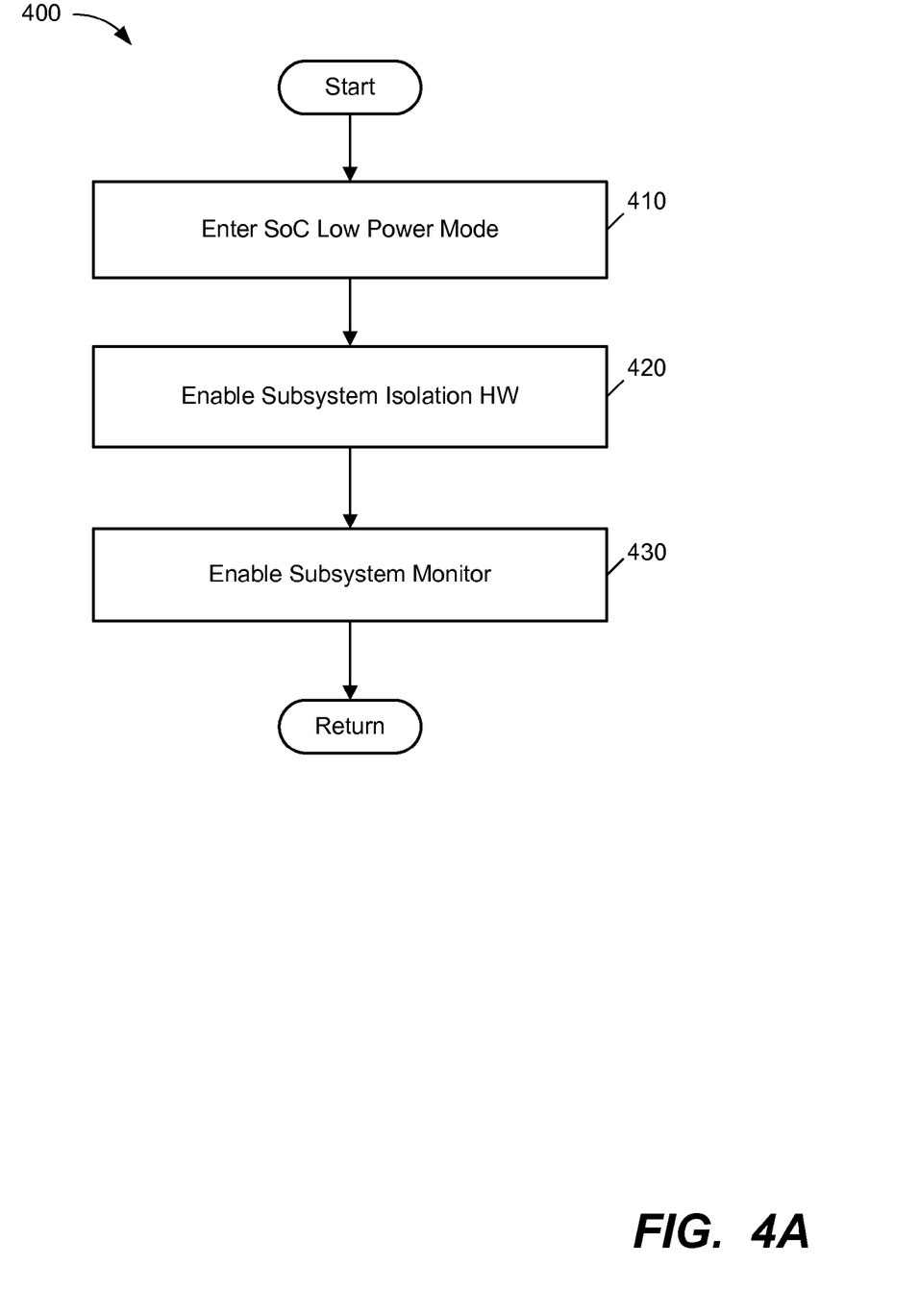
FIG. 4A is a flowchart describing aspects of an exemplary embodiment of a method for implementing a subsystem of an SoC in a PCD.

FIG. 4A is a flowchart describing aspects of an exemplary embodiment of a method 400 for implementing a subsystem of an SoC in a PCD. In bloc 410 an SoC such as SoC 202 of FIG. 2A-2B or 302 of FIG. 3 enters into a low power mode, such as a reduced power or zero power state or mode. The SoC may enter the lower power mode as part of a power savings routine or program of the SoC or the PCD, such as when the PCD is not being actively operated by an end user.

The SoC includes at least one subsystem, such as Subsystem A 220/320 discussed above, configured to operate independently of the rest of the SoC. At block 420, isolation hardware for the subsystem, such as Isolation HW 220/320 of Subsystem A 320/330 discussed above is engage to electrically and otherwise isolate the subsystem from the rest of the SoC.

A subsystem monitor of the subsystem is enabled at block 430 of the method 400. The subsystem monitor may include a Monitor Module 224/324 of Subsystem A 220/320 discussed above for FIGS. 2A-2B and 3. The subsystem monitor operates to monitor the communications/signals from a processor and perform external access detection and recovery for the subsystem as described in FIGS. 5A-5B below.

Figure 5A:
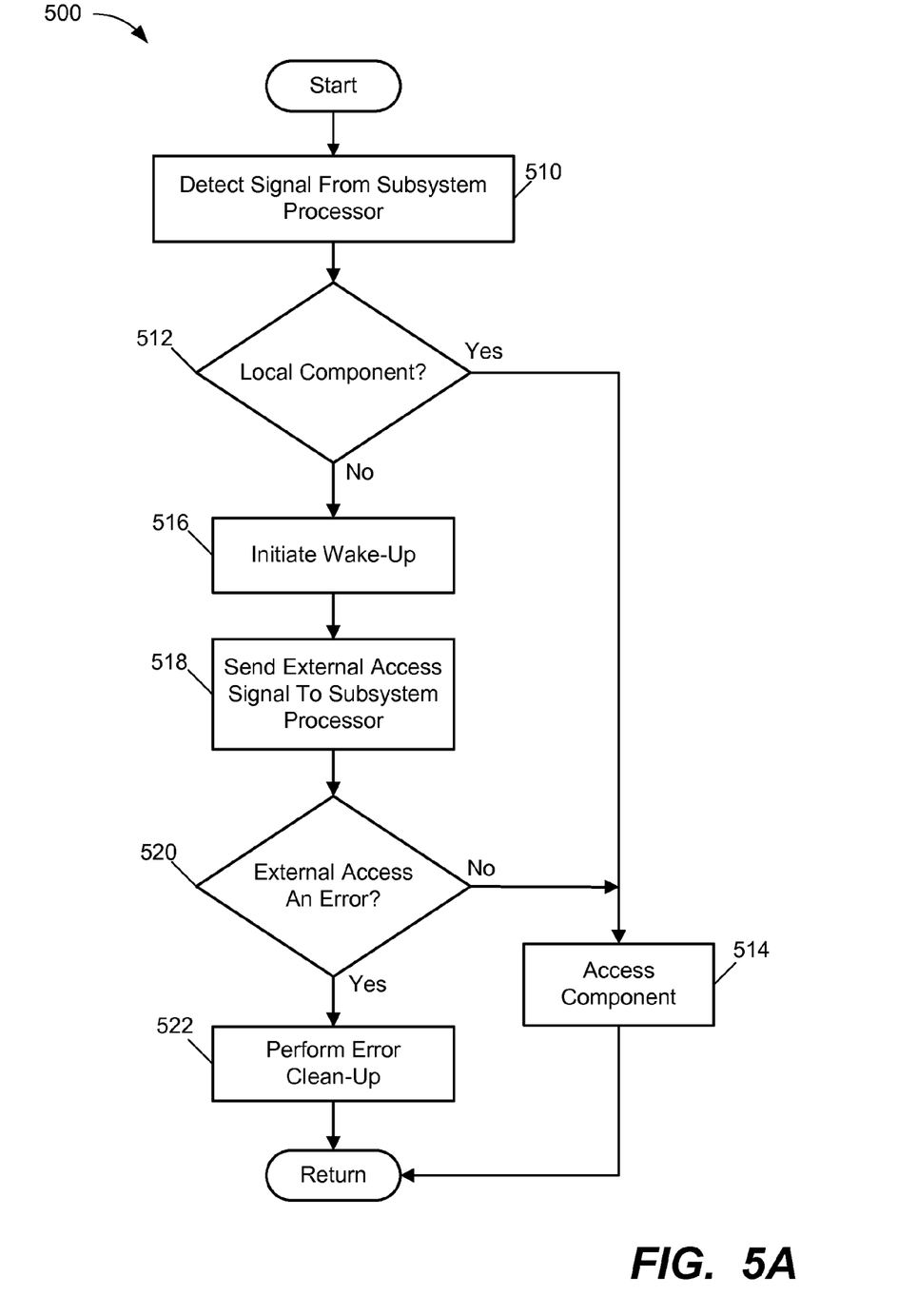
FIG. 5A is a flowchart describing aspects of an exemplary embodiment of a method for providing external access detection and recovery by the subsystem of the SoC.
Figure 5B:
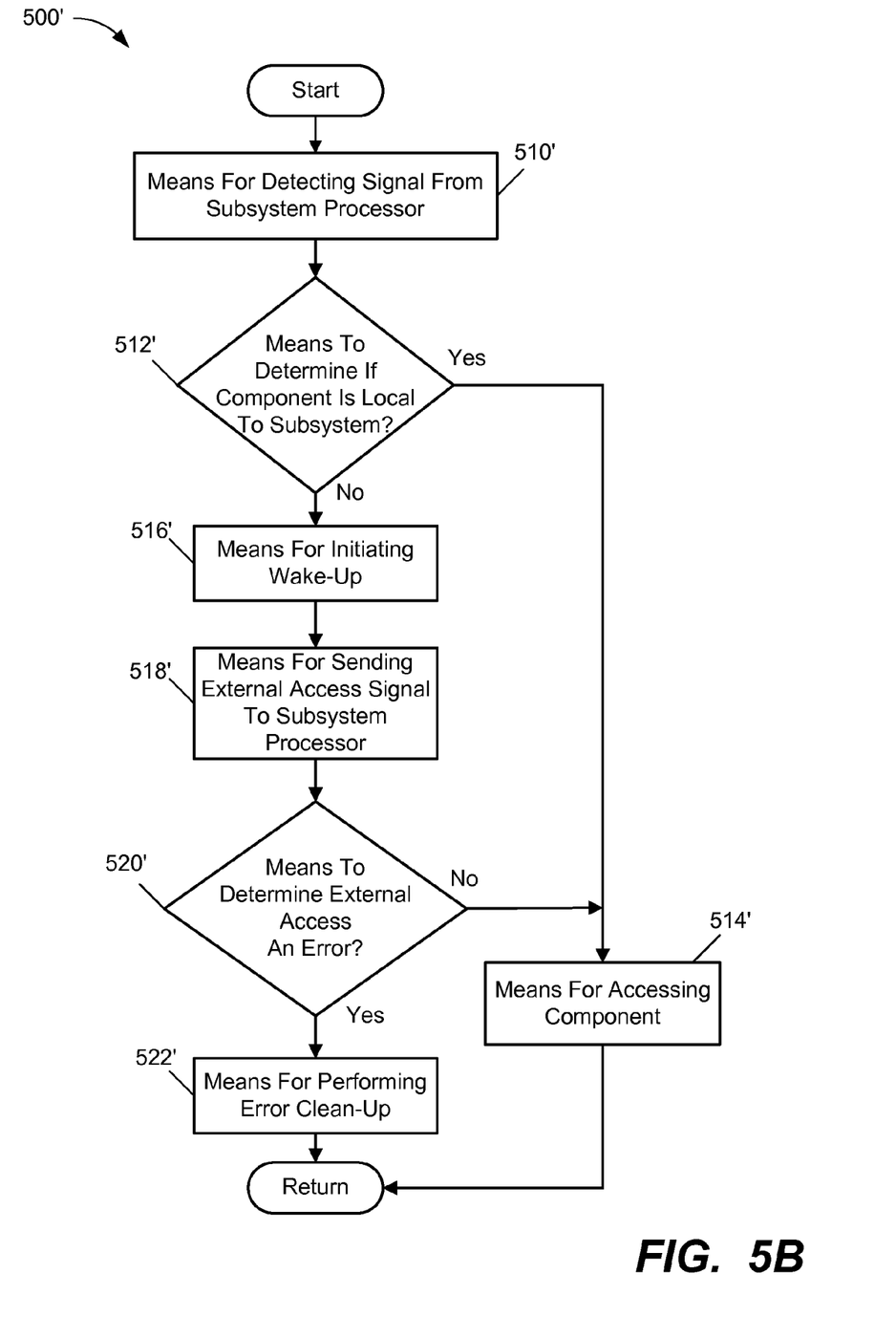
FIG. 5B illustrates example components capable of performing the aspects of the method illustrated in FIG. 5A.

Turning to FIG. 5A, a flowchart describing an exemplary embodiment of a method 500 for providing external access detection and recovery by the subsystem of the SoC is illustrated. The method 500 may be implemented as the subsystem monitor block 430 of method 400 discussed above. The method 500 begins with block 510 where a signal from a subsystem processor is detected. The subsystem is capable of, and is operating independently of the rest of the SoC, such as for example Subsystem A 220 of FIG. 2A. Using Subsystem A 220 as the example, during operation signals or communications from the processor, CPU 222 are monitored and/or detected by a Monitor Module 224 which may include hardware monitors.

As discussed above, such signals or communications from the CPU 222 may include attempts to access various components such as the memory 228 or sensor 229 of Subsystem A 220, or other components. Once a signal/communication from the CPU 222 is detected, at block 512 a determination is made whether the component accessed is local, or whether the CPU 222 is attempting to access a component external to the subsystem. For example, the CPU 222 may be attempting to access another component on the SoC 202 external to Subsystem A 220, or the CPU 222 may be attempting to access a component such as DDR 280 that is external to the SoC 202.

If the component that the CPU 222 is local, i.e. is part of the Subsystem A 220 operating independently of the rest of the SoC, the CPU 222 accesses the component in block 514 and the method 500 returns, which may include returning to monitoring the signals/communications from the CPU 222.

If the determination in block 512 is that the component the CPU 222 wants to access is not local to Subsystem A 220, a wake-up is initiated in block 516. Continuing with the example of the Monitor Module 224 of FIG. 2A, the wake-up of block 516 may comprise causing the SoC 202 to wake up/enter into a functional state or mode as described above. In one embodiment, wake-up of block 516 may be accomplished by the Monitor Module 224 sending a signal or communication, such as an interrupt, to an always-on SoC Power Manager 270 of the SoC 202. The SoC Power Manager 270 may then act in accordance with the received signal/communication or interrupt to cause parts of, or the entire SoC 202 to power up and/or become functional in order to create a pathway for the access desired by the CPU 222.

The wake-up of block 516 may instead, or additionally, comprise causing the Subsystem A 220 itself to come into a state or mode where it can communicate or interact with the rest of the SoC 202. For example, in one embodiment, this Subsystem A 202 portion of the wake-up of block 516 may be accomplished by the Monitor Module 224 sending a signal or communication to a State Machine 225 (which may be separate from or incorporated into the Monitor Module 224 as desired). The State Machine 225 may then cause Subsystem A 220 to come out of the island mode so that it operates with the rest of the SoC 202 again, such as by disabling the Isolation HW 226 and/or establishing communications between the interconnect/bus 250 of the SoC 202 and the CPU 222. In various embodiments, block 516 may cause the Subsystem A 220 to be put into the state or mode where is can communicate/interact with the SoC 202 to take place simultaneously with, before, or after the wake-up of the SoC 202 as desired.

In block 518 of the method, an external access signal is sent to the subsystem processor seeking to access an external component. Again continuing with the example of the system 200 of FIG. 2A, the signal of block 518 may in an embodiment be a signal or communication, such as an interrupt from the Monitor Module 224 to the CPU 222. This signal notifies or alerts the CPU 222 that it is attempting to access a component such as a memory that is external to Subsystem A 220.

The method will then determine in block 520 whether the external access attempt was an error. For example, the CPU 222 upon receipt of the signal or interrupt from the Monitor Module 224 may determine whether the attempt to access the external component was a result of an error in code or a routine operating on the CPU 222 or within Subsystem A 320. If the external access was not an error the CPU may make that determination, or simply ignore the signal/interrupt from the Monitor Module 224 and access the external component in block 514 and the method 500 ends as the SoC 202 has been awakened/returned to a functional state or mode and Subsystem A 220 is no longer operating in an island mode and/or independently of the SoC 202.

If the external access attempt was a result of some error, the method may attempt to perform an error clean-up to correct the error. Such clean-up may include the CPU 222 in the above example operating or initiating error-handling routine(s)/code(s) to try and address the error that caused the external access as discussed above. The method 500 will then return.

As would be understood by one of ordinary skill in the art, FIGS. 4A and 5A describes only one exemplary embodiment of the disclosed methods 400 and 500. In other embodiments, additional blocks or steps may be added to the methods 400 illustrated in FIG. 4A or 500 illustrated in FIG. 5A. Similarly, in some embodiments various blocks or steps shown in FIG. 4A or 5A may be combined or omitted. Such variations of the methods 400 or 500 are within the scope of this disclosure.

Additionally, certain steps in the processes or process flows described in this specification, including FIG. 4A or 5A may naturally precede others for the invention to function in the embodiments as described. However, the disclosure is not limited to the order of the steps described if such order or sequence does not alter the functionality of the invention. Moreover, it is recognized that some steps may performed before, after, or in parallel (substantially simultaneously) with other steps without departing from the scope of the disclosure. For example as discussed above, in FIG. 5A it is not necessary that any or all of the wake-up initiated in block 516 be performed before the sending of the external access signal of block 518. Instead, some or all of the wake-up of block 516 could be performed after the sending of the external access signal of block 518, or even after the perform error clean-up of block 522 if desired in various embodiments.

Additionally, in some instances, certain steps may be omitted or not performed without departing from the invention. Such variations of the methods 400 and 500 are within the scope of this disclosure. Further, words such as "thereafter", "then", "next", "subsequently", etc. are not intended to limit the order of the steps. These words are simply used to guide the reader through the description of the exemplary method.

The various operations, methods, or functions described above for both methods 400 and 500 may be performed by various hardware and/or software component(s)/module(s).

Figure 4B:
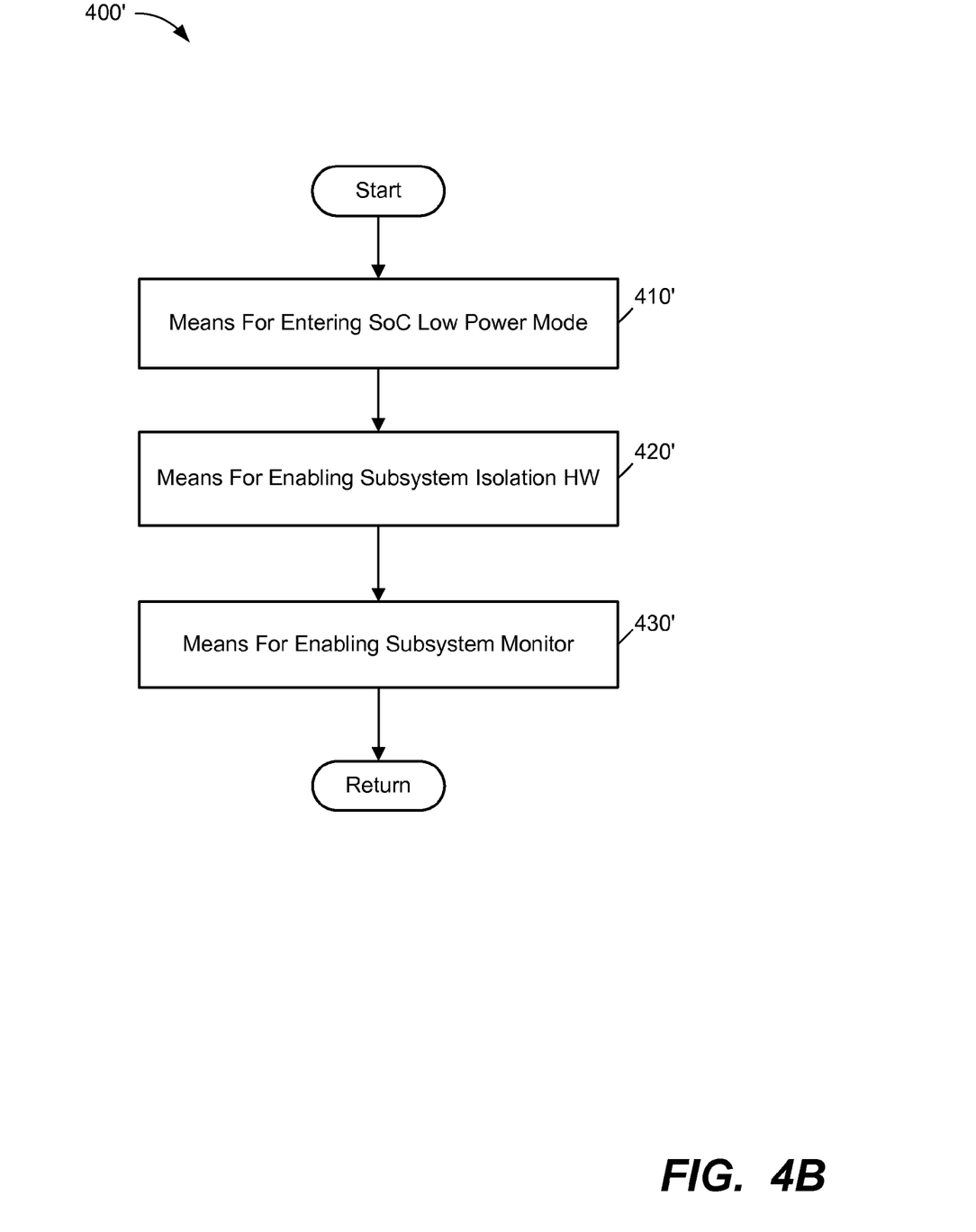
FIG. 4B illustrates example components capable of performing the aspects of the method illustrated in FIG. 4A.

Such component(s) and/or module(s) may provide the means to perform the various described operations, methods, or functions. Generally, where there are methods illustrated in Figures having corresponding counterpart means-plus-function Figures, the operation blocks correspond to means-plus-function blocks with similar numbering. For example, blocks 410-430 illustrated in FIG. 4A correspond to means-plus-function blocks 410'-430' illustrated in FIG. 4B. Similarly, blocks 510-522 illustrated in FIG. 5A correspond to means-plus-function blocks 510'-522' illustrated in FIG. 5B.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed processor-enabled processes is explained in more detail in the above description and in conjunction with the drawings, which may illustrate various process flows.

In one or more exemplary aspects as indicated above, the functions described may be implemented in hardware, software, firmware, or any combination thereof. If implemented in software, the functions may be stored on or transmitted as one or more instructions or code on a computer-readable medium, such as a non-transitory processor-readable medium. Computer-readable media include both data storage media and communication media including any medium that facilitates transfer of a program from one location to another.

A storage media may be any available media that may be accessed by a computer or a processor. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of non-transitory computer-readable media.

Although selected aspects have been illustrated and described in detail, it will be understood that various substitutions and alterations may be made herein without departing from the present invention, as defined by the following claims.

What is claimed is:

1. A method for external access detection and recovery in a subsystem of a system-on-a-chip (SoC) in a portable computing device (PCD), the method comprising:
    operating the subsystem of the SoC in a first mode independently of the SoC while the SoC is in a low power state, the subsystem comprising a processor in communication with a memory, a sensor, and a monitor module;
    detecting with the monitor module a request for access by the processor to a component external to the subsystem; and
    in response to the detected request for access to the component external to the subsystem:
        causing the SoC to enter a full power state, and
        causing the subsystem to operate in a second mode.

2. The method of claim 1, wherein causing the SoC to enter a full power state further comprises:
    sending a signal from the monitor module of the subsystem to a power manager of the SoC to activate the power manager.

3. The method of claim 1, wherein the monitor module comprises a hardware monitor in communication with a state machine and wherein causing the subsystem to operate in the second mode further comprises the monitor module activating the state machine to disable an isolation hardware of the subsystem.

4. The method of claim 3, wherein the state machine is external to the monitor module.

5. The method of claim 1, further comprising:
    in response to the detected request by the processor for access to the component external to the subsystem:
        sending a notification signal from the monitor module of the subsystem to the processor notifying the processor that the component is external to the subsystem.

6. The method of claim 5, further comprising:
    initiating an error handling routine with the processor of the subsystem in response to the received notification signal from the monitor module.

7. The method of claim 1, wherein the component external to the subsystem is a memory.

8. The method of claim 1, wherein the sensor is in communication with at least one of an accelerometer or a gyroscope of the PCD.

9. A computer system for a system-on-a-chip (SoC) in a portable computing device (PCD), the system comprising:
    a subsystem of the SoC configured to independently operate in a first mode, the subsystem comprising:
        a processor in communication with a sensor and a memory, and
        a memory monitor in communication with the processor,
    wherein the monitor module is configured to:
        detect a request for access by the processor to a component external to the subsystem,
        cause the SoC to enter a full power state in response to the detected request for access, and
        cause the subsystem to operate in a second mode in response to the detected request for access.

10. The system of claim 9, further comprising a power manager of the SoC in communication with the monitor module, wherein:
    the monitor module is configured to send a signal to the power manager of the SoC in response to the detected request for access, and
    the power manager is configured to cause the SoC to enter the full power state.

11. The system of claim 9, wherein:
    the subsystem further comprises an isolation hardware to electrically isolate the subsystem from the SoC; and
    the monitor module comprises:
        a hardware monitor, and
        a state machine in communication with the hardware monitor and the isolation hardware,
    wherein in response to the detected request for access, the hardware monitor activates the state machine to disable the isolation hardware.

12. The system of claim 11, wherein the state machine is located external to the monitor module.

13. The system of claim 9, wherein the monitor module is further configured to:
 send a notification signal to the processor notifying the processor that the component is external to the subsystem in response to the detected request for access.

14. The system of claim 13, wherein the processor is configured to imitate an error handling routine in response to the received notification signal from the monitor module.

15. The system of claim 9, wherein the component external to the subsystem is a memory.

16. The system of claim 9, wherein the sensor is in communication with at least one of an accelerometer or a gyroscope of the PCD.

17. A computer program product comprising a non-transitory computer usable medium having a computer readable program code embodied therein, said computer readable program code adapted to be executed to implement a method for external access detection and recovery in a subsystem of a system-on-a-chip (SoC) in a portable computing device (PCD), the method comprising:
 operating the subsystem of the SoC in an first mode independently of the SoC while the SoC is in a low power state, the subsystem comprising a processor in communication with a memory, a sensor, and a monitor module;
 detecting with the monitor module a request for access by the processor to a component external to the subsystem; and
 in response to the detected request for access to the component external to the subsystem:
  causing the SoC to enter a full power state, and
  causing the subsystem to operate in a second mode.

18. The computer program product of claim 17, wherein causing the SoC to enter a full power state further comprises:
 sending a signal from the monitor module of the subsystem to a power manager of the SoC to activate the power manager.

19. The computer program product of claim 17, wherein the monitor module comprises a hardware monitor in communication with a state machine and wherein causing the subsystem to operate in a second mode further comprises the monitor module activating the state machine to disable an isolation hardware of the subsystem.

20. The computer program product of claim 17, further comprising:
 in response to the detected request by the processor for access to the component external to the subsystem:
  sending a notification signal from the monitor module of the subsystem to the processor notifying the processor that the component is external to the subsystem.

21. The computer program product of claim 20, further comprising:
 initiating an error handling routine with the processor of the subsystem in response to the received notification signal from the monitor module.

22. The computer program product of claim 17, wherein the component external to the subsystem is a memory.

23. The computer program product of claim 17, wherein the sensor is in communication with at least one of an accelerometer or a gyroscope of the PCD.

24. A computer system for external access detection and recovery in a subsystem of a system-on-a-chip (SoC) in a portable computing device (PCD), the system comprising:
 means for operating the subsystem of the SoC in a first mode independently of the SoC while the SoC is in a low power state, the subsystem comprising a processor in communication with a memory and a sensor;
 means for detecting a request for access by the processor to a component external to the subsystem; and
 in response to the detected request for access to the component external to the subsystem:
  means for causing the SoC to enter a full power state, and
  means for causing the subsystem to operate in a second mode.

25. The system of claim 24, wherein the means for causing the SoC to enter a full power state further comprises:
 means for sending a signal from the subsystem to a power manager of the SoC to activate the power manager.

26. The system of claim 24, wherein the means for causing the subsystem to operate in the second mode further comprises a means for disabling an isolation hardware of the subsystem.

27. The system of claim 24, further comprising:
 in response to the detected request by the processor for access to the component external to the subsystem:
  means for sending a notification signal to the processor notifying the processor that the component is external to the subsystem.

28. The system of claim 27, further comprising:
 means for initiating an error handling routine of the subsystem in response to the received notification signal.

29. The system of claim 24, wherein the component external to the subsystem is a memory.

30. The system of claim 24, wherein the sensor is in communication with at least one of an accelerometer or a gyroscope of the PCD.

* * * * *